United States Patent [19]

Kiuchi

[11] Patent Number: 4,678,306
[45] Date of Patent: Jul. 7, 1987

[54] FILM FEEDING INDICATION DEVICE FOR CAMERA

[75] Inventor: Masayoshi Kiuchi, Kanagawa, Japan

[73] Assignee: Canon Kabushiki Kaisha, Tokyo, Japan

[21] Appl. No.: 787,382

[22] Filed: Oct. 15, 1985

[30] Foreign Application Priority Data

Oct. 17, 1984 [JP] Japan .................................. 59-217927

[51] Int. Cl.4 ...................... G03B 17/18; G03B 17/36
[52] U.S. Cl. .................................. 354/217; 354/289.1
[58] Field of Search .............................. 354/217, 289.1

[56] References Cited

U.S. PATENT DOCUMENTS 4,432,628 2/1984 Sakurada et al. ............... 354/217 X Primary Examiner—Michael L. Gellner
Attorney, Agent, or Firm—Toren, McGeady & Associates

[57] ABSTRACT

A film feeding indication device of the type in which as a number of pulses, proportional to the distance the film has advanced, are formed, when the produced pulse number reaches a prescribed value, an indication representing the completion of film feeding is presented. The indication device, despite the produced pulse number becomes unable to reach the aforesaid prescribed value, forcibly presents that indication provided that a particular minimum value is reached.

6 Claims, 10 Drawing Figures

FILM FEEDING INDICATION DEVICE FOR CAMERA

BACKGROUND OF THE INVENTION

1. Field of the Invention

This invention relates to an indication device for camera, and more particularly to an indication device for indicating the feeding state of film.

2. Description of the Prior Art

It is known to provide an indication device in which movement of film is sensed to produce a number of pulses, and the viewing condition of an indicator is varied depending on the produced number of pulses, thereby the film feeding state is indicated.

In this type of device, when the film has advanced exactly one frame, the number of pulses produced is made able to reach a prescribed value of, for example, three, and this can be viewed as the indicating pattern varies in synchronism with each of the three pulses.

As the means for sensing the film movement to produce the pulses, use has been made of a mechanical switch with an actuator therefor in frictional contact with the film. If the actuator slips, for example, because of poor frictional force, it will, however, result that despite the normal film feeding operation has taken place, the critical value for the pulse number cannot be reached.

In such a case, as the indicator presents a pattern representing that the film feeding is stopped between frames, the photographer will mistake it as being due to the occurrence of a faulty operation of the film transportation mechanism, despite it having normally operated.

Taking a practical example of the device whose indicating pattern varies in response to production of each of the three pulses from a detecting circuit, beginning with a start position of FIG. 3B and transferring successively to positions of FIGS. 3C to 3E, respectively, as the photographer is accustomed to take the only pattern of FIG. 3E as representing the completion of the film feeding, if it happens by some cause that, despite the film has advanced through the length of one frame, the detecting circuit does not produce three pulses but only two, and therefore, that the indicating operation does not proceed from the position of FIG. 3D, the photographer is given an erroneous information that an abnormal film feeding operation has taken place despite that operation is normal.

SUMMARY OF THE INVENTION

With the foregoing in mind, the present invention has been made, and its object is to provide the indication device with means responsive to production of that majority of the prescribed pulse number for each cycle of normal film feeding operation which can be regarded as the completion of normal film feeding for forcing the indication device to present that indicating pattern which represents that the film has advanced through the full length of one frame, thereby a warning indication for incompletion of the film feeding is prevented from being given to the photographer.

To achieve this object, in an embodiment of the invention applied to the indication device having a pulse forming circuit responsive to movement of the film for producing pulses successively, a detector responsive to attainment of the number of pulses produced from the pulse forming circuit to a prescribed value for producing an output signal, and an indicator responsive to the signal for presenting an indication that the film has advanced one frame, means is provided for producing another output signal when the number of pulses produced from the pulse forming circuit exceeds a value equal to one-half of the aforesaid prescribed value, whereby if the detector fails to produce the first signal even after the film has advanced to the full length of one frame, the second signal from that means or second detector is brought in to drive the indicator independently of the first detector for presenting an indication that the film feeding has been normally operated.

Another object is to provide a film feeding indication device of the type in which as film feeding is monitored in the form of a signal of ever-changing magnitude, when the magnitude of the signal reaches a prescribed critical level, the indication representing that the film feeding is completed is presented, whereby even if the monitoring signal becomes unable to reach that critical state when the film has advanced to the full length of one frame, the occurrence of a particular preceding state of the monitoring signal forces indicating means to present an indication for the completion of film feeding and to provide a film feeding detection device therefor.

Other objects of the invention will become apparent from the following description of an embodiment thereof by reference to the accompanying drawings.

DETAILED DESCRIPTION OF THE PREFERRED EMBODIMENT

Figure 1:
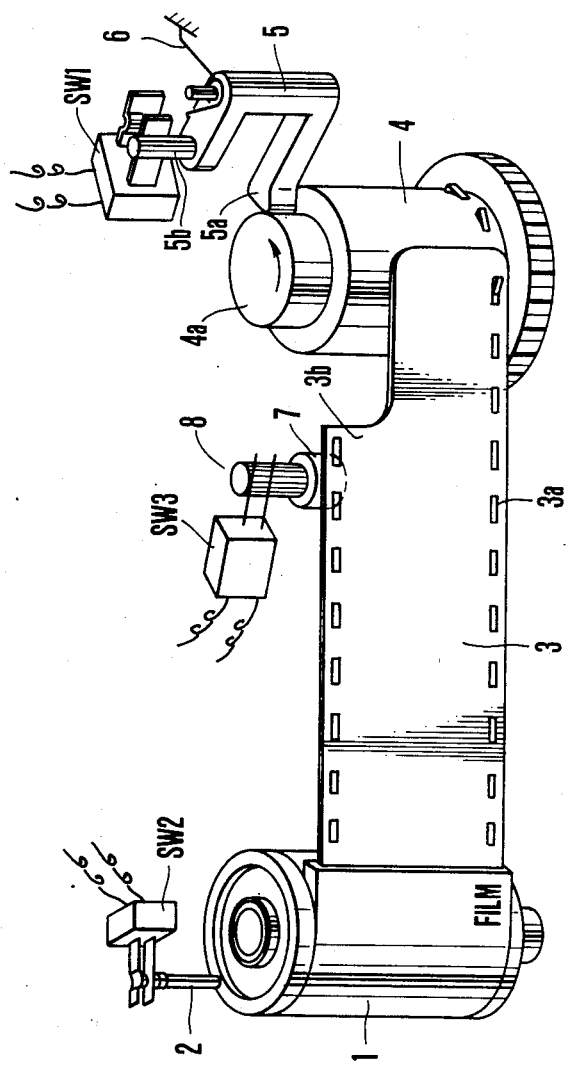
FIG. 1 is a perspective view illustrating an example of the construction and arrangement of a film motion sensor used in a camera employing the indication device of the invention.

Referring to FIG. 1, when a film cartridge 1 is inserted into and seated in a chamber within the camera housing, a pin 2 is moved upward, thereby a normally open switch SW2 is closed. The pin 2 and switch SW2 constitute a member for detecting whether or not a cartridge is present in the chamber. Though, in this example, the pin 2 is shown to be arranged to abut on the bottom of the cartridge 1, it may otherwise be arranged to be pushed by the side wall of the cartridge 1 when the latter is inserted into the chamber.

A takeup spool 4 has a number of pawls for engaging perforations in the leader 3a of film 3 and when the takeup spool 4 rotates in a direction indicated by arrow, it takes up the fed film on a large diameter portion thereof. Coaxially positioned adjacent thereto is a small diameter portion 4a.

A lever 5 is urged by a spring 6 so that its one end 5a rests on the small diameter portion 4a until all the film leader is convoluted on the large diameter portion. A normally open switch SW1 is arranged adjacent a pin 5b on another arm of the lever 5 to close when the film of full width starts to be wound up. The switch SW1 and lever 5 constitute a member for detecting whether or not the film is present on the takeup spool 4.

A roller 7 is pressed against the upper vicinity of film 3 and is driven to rotate by the moving film 3. Coaxially mounted on the roller 7 is a cylinder 8 having longitudinal electrically conductive and non-conductive patterns alternating each other on the periphery thereof. A switch SW3 has a pair of contacts arranged to co-operate with the cylinder 8 in a manner that when the cylinder 8 rotates, the switch SW3 turns on and off repeatedly. The roller 7, rotary cylinder 8 and switch SW3 constitute a film motion sensor. Instead of using the roller 7 it is also possible to use a toothed wheel arranged to engage in the perforations of the film. The rotary cylinder 8 also may otherwise be constructed with a number of radial protuberances by which the switch SW3 is turned on and off as the cylinder 8 rotates. Also, instead of such a mechanical form of the sensor as in the illustrated embodiment, another form, namely photo-electric or static capacity form, may be taken.

Figure 2:
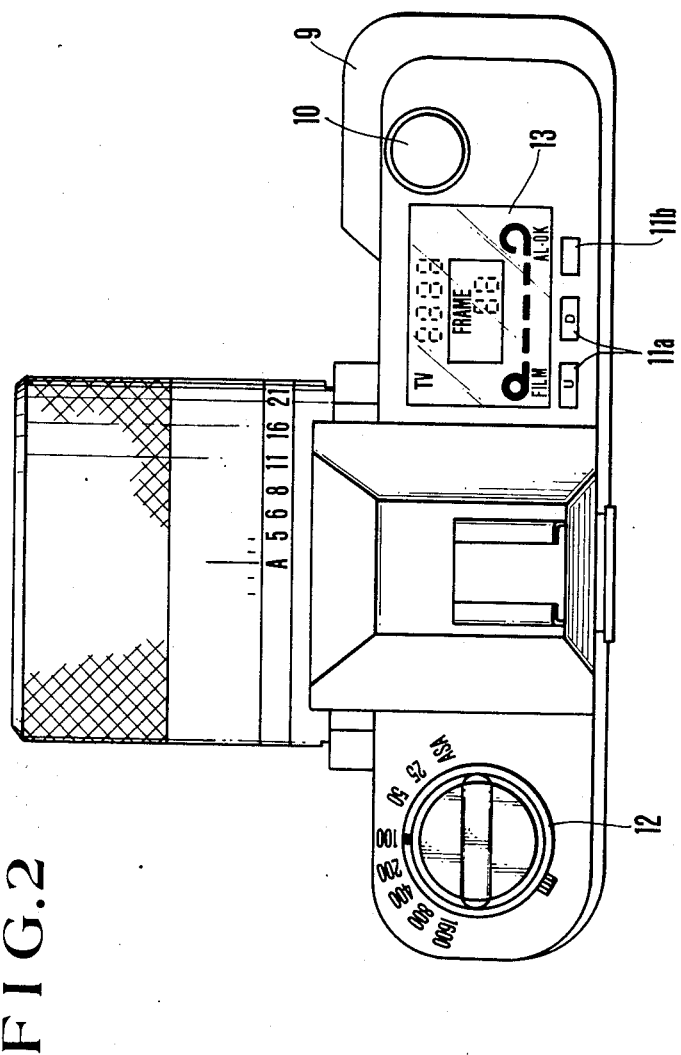
FIG. 2 is a top view of the camera having the indication device of the invention.

In FIG. 2 there is shown an outer appearance of the camera where 9 is a grip portion; 10 is a release button; 11a is a pair of push buttons for use in setting photographic informations such as shutter speed. When either one of the buttons 11a is pushed down, the exposure factor changes from one value to another. When a third push button 11b is pushed down, a lamp (not shown) is lighted on to illuminate an indicator 13 made of, for example, a liquid crystal light shutter display. 12 is a film rewind crank.

Figure 4:
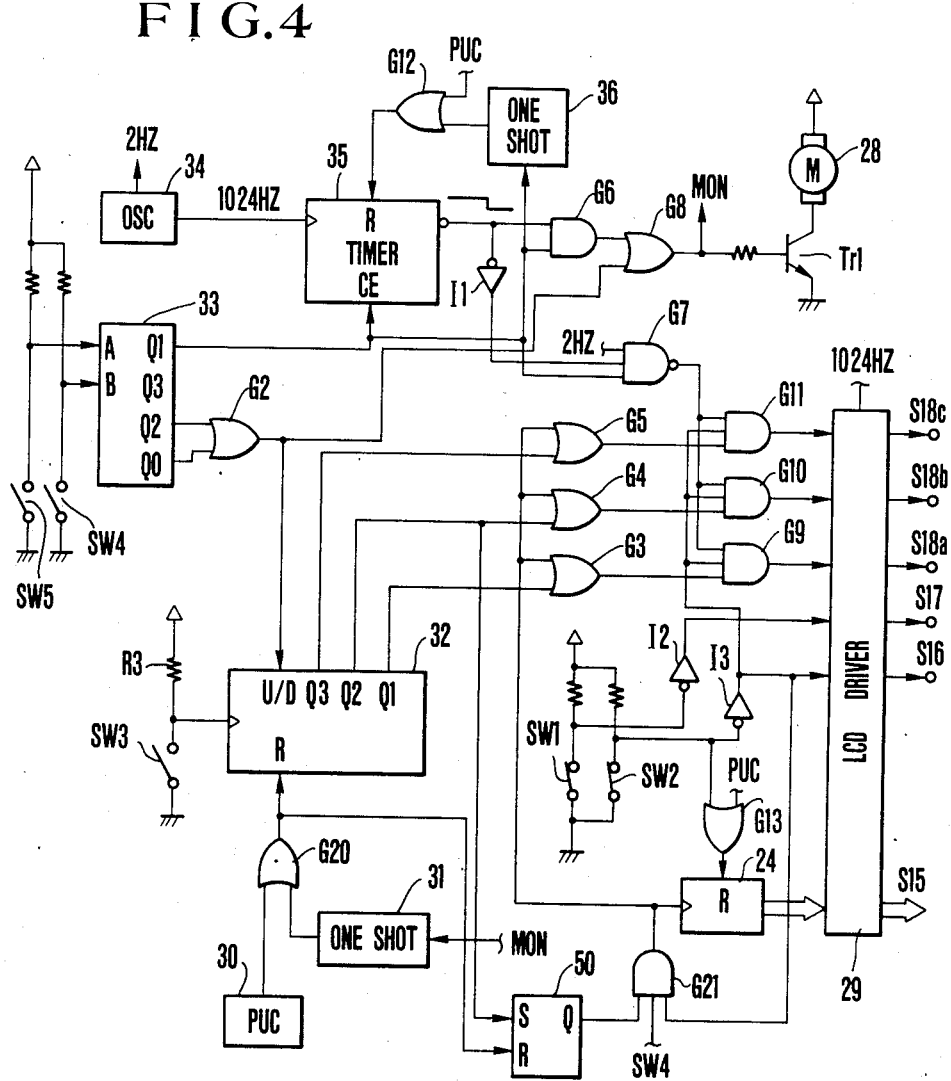
FIG. 4 is an electrical circuit diagram of an embodiment of an indication device according to the present invention.

FIG. 4 illustrates the circuitry of an embodiment of the indication device according to the present invention. The circuit includes a switch SW4 arranged to open when each cycle of film winding operation is completed and to be maintained open until the next cycle starts, another switch SW5 is arranged to open when the camera is not in the film rewind mode, a decoder 33 having two inputs A and B connected to the outputs of the switches SW5 and SW4, respectively, and a winding timer 35 having a count-enable terminal CE connected to a first output stage Q1 of the decoder 33 and responsive to termination of a prescribed time interval during which pulses from a clock pulse generator 34 are counted for changing its output from high to low level.

An AND gate G6 is connected at one input thereof to the output of the timer 35, and at the other input thereof to the output Q1 of the decoder 33, and has an output connected to the base of a transistor Tr1 through an OR gate G8.

An electric motor 28 for driving the spool 4 has a winding connected at its one end to the collector of the transistor Tr1.

A Johnson counter 32 for counting the pulses from the aforesaid switch SW3 has an UP/DOWN terminal U/D connected through an OR gate G2 to outputs Q0 and Q2 of the decoder 33, and three outputs Q1 to Q3 each connected to one input of respective OR gates Q3 to G5.

Inverters I2 and I3 are connected to the aforesaid swtiches SW1 and SW2, and AND gates G9 to G11 are connected at respective first inputs, to the respective outputs of the OR gates G3 to G5. Second inputs of the AND gates G9 to G11 are connected to the common output of the inverter I3, while third inputs thereof are connected to the common output of a NAND gate G7.

Another AND gate G21 has three inputs connected to the respective outputs of the inverter I3, a flip-flop 50 and the switch SW4 and has an output connected to a frame counter 24 and also to the other inputs of the OR gates G3 to G5.

A driver 29 for the liquid crystal display (LCD) has an output S18c at which the output of the gate G11 appears to drive a pattern 18c of the indicator 13 of FIGS. 3A to 3F, another output S18b at which the output of the gate G10 appears to drive another pattern 18b, and another output S18a at which the output of the gate G9 appears to drive another pattern 18a. Also an output S17 drives a pattern 17 by the output of the inverter I2, another output S16 drives another pattern 16 by the output of the inverter I3, and another output S15 drives a 7-segment pattern 15 of two digits representing the number of film frames exposed on the basis of the output of the counter 24.

A power-up clear circuit 30 produces a power-up clear pulse output when a battery is loaded in the camera. One-shot circuits 31 and 36 are triggered in response to the output of the gate G8 and the output Q1 of the decoder 33, respectively. A pulse generating circuit 34 produces two trains of pulses with frequencies 1024 Hz and 2 Hz.

The flip-flop 50 is reset by the output of the gate G20 and is set by the output Q2 of the Johnson counter 32.

The operation of the indication device of the invention is next described. When the film cartridge 1 is inserted into the camera, pushing the pin 2 upward, the switch SW2 turns on.

Thereby, the output of the inverter I3 is changed to high level which is then transferred to the output S16 of the driver 29 so that the film cartridge-shaped pattern 16 is caused to appear. Thus, the indicating form transfers from the pattern of FIG. 3A to the pattern of FIG. 3B, indicating that the cartridge is present in the camera. The operator then pulls the leader 3a of the film 3 and brings it into engagement with one of the pawls of the spool 4. After a back cover is closed, the release button is pushed down to wind up the light-struck area of the film.

An exposure control circuit of known construction (not shown) then operates to initiate an exposure in vain. At the termination of an exposure time (which is assumed to be very short because, at this time, the camera release is carried out for the purpose of loading the film), the trailing curtain of a shutter (not shown) runs down, thereby the switch SW4 is turned on. Responsive to closure of the switch SW4, the decoder 33 produces an output signal of high level at Q1, (since the input A of the decoder 33 only is high because the switch SW5 is open when in the wind-up mode). By this output Q1, the one-shot circuit 36 is triggered to reset the timer 35 to the initial state, and because its count-enable terminal CE is given that output Q1, the timer 35 starts to count pulses from the pulse generator 34. Because, as has been described above, the output of the timer 35 has high level from the initial state until the number of pulses counted reaches a prescribed value, the output of the AND gate G6, and therefore the output of the OR gate G8, also are maintained at high level for the aforesaid working time of the timer 35, during which the transistor Tr1 is conducting to energize the motor 28. As the motor 28 rotates, the takeup spool 4 is rotated in the direction of the arrow to wind up the film 3. Also, as the roller 7 is rotated by the moving film 3, the ON and OFF operation of the switch SW3 recycles.

Meanwhile, in synchronism with the start of rotation of the motor 28, the one-shot circuit 31 is triggered by the output of high level from the gate G8 and its output pulse is applied through the gate G20 to the counter 32 and flip-flop 50, thereby the counter 32 and flip-flop 50 are moved to their initial positions. Therefore, the counter 32 is permitted to count pulses to be produced from the switch SW3 from the first one. Also since, at this time, the U/D input of that counter 32 is rendered low, the counter 32 is set in UP mode. Responsive to the first pulse produced, the counter 32 changes its output Q1 to high level which is applied through the gate G3 to one of the three inputs of the AND gate G9, the other two of which are supplied with the output of high level from the inverter I3 and the output of the gate G7. Because the output of the gate G7 is maintained at high level for the working time of the timer 35, responsive to the output of the gate G3, the gate G9 produces an output of high level, causing the output S18a of the driver 29 to take high level, thereby the one of the three rectangular patterns in a row which is laid out as extendng from the mouth of the cartridge-shaped pattern 16, or the pattern 18a, is driven to appear as shown in FIG 3C. Then, when a second pulse is applied to the counter 32, the output Q2 of the counter 32 changes to high level, and therefore the output of the gate G10 changes to high level. As a result, the two outputs S18a and S18b of the driver 29 take high level, driving the first two of the line patterns, 18a and 18b, thereby the indicating state is changed to that shown in FIG. 3D. Such change of the output Q2 of the counter 32 to high level also causes the flip-flop 50 to be set so that its output becomes high level. Then, responsive to a third pulse, the counter 32 changes its output Q3 to high level. As a result, all the outputs Q1 to A3 of the counter 32 are high, and, therefore, the gates G9 to G11 produce the outputs of high level, thereby the patterns 18a to 18c are driven to further change the indicating state to that shown in FIG. 3E. In such a manner, movement of the film 3 through the length of one frame can be viewed as the indicator changes its state from FIG. 3C to FIG. 3E.

As the film feeding continues, when the neck 3b of the leader of the film 3 comes in contact with the lever 5, the lever 5 is turned in a clockwise direction, thereby the switch SW1 is closed. Responsive to closure of this switch SW1, the inverter I2 produce an output of high level, causing the output S17 of the driver 29 to change to high level. Therefore, a film takeup spool-shaped pattern 17 with letters "AL-OK" for automatic loading O.K. is indicated as shown in FIG. 3F, informing the operator of the fact that the automatic loading is completed.

When the film 3 has advanced one frame, or the first cycle of film winding operation comes to end, the switch SW4 turns off, causing the output of high level of the decoder to shift from Q1 to Q3, thereby the transistor Tr1 is turned off to de-energize the motor 28, and the rotation of the spool 4 is stopped.

Such movement of the switch SW4 from ON to OFF also results in that all the inputs of the gate G21 are high level, and its output becomes high level. Therefore, the counter 24 counts up one step. Also, because the output of the gate G21 is connected to one inputs of the OR gates G3 to G5, the patterns 18a to 18c appear as shown in FIG. 3F.

After that, each time the release button 10 is pushed down, the above-described sequence of operations recycles. Therefore, each time the film advances one frame, the patterns 18a to 18c are displayed as shown in FIG. 3B to FIG. 3E, thus indicating that the film feeding goes on. And, in synchronism with the termination of each cycle of film feeding operation, the counter 24 counts up one pulse from the gate G21. The counted value is displayed by the 7-segment patterns 15.

As has been described above, movement of the film is sensed by the switch SW3 in the form of an everincreasing number of pulses produced in response to recycling of the ON-OFF operation of the switch SW3. So long as the film feeding operation is normal, this fact should be indicated by the above-described three rectangular patterns 18a to 18c. But if it happens by something wrong that despite the normal film feeding operation has taken place, the number of pulses produced becomes unable to reach the normal value, the indication device operates in the following manner.

Now assuming that despite the film having advanced through the full length of one frame, the switch SW3 produces a fewer number of pulses (two pulses) than the normal number of pulses (three pulses).

It is in this condition that the aforesaid counter 32 counts up only two pulses. Therefore, the output state of the counter 32 changes only two times, that is, the first change of the output Q1 to high level, and the second change of both outputs Q1 and Q2 to high level.

Figure 3A:
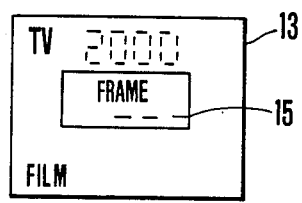
FIGS. 3A to 3F are plan views illustrating variation of the indicating state of the indication device according to the present invention.
Figure 3D:
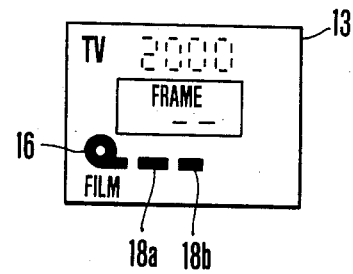
Figure 3B:
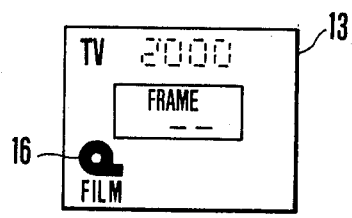
Figure 3E:
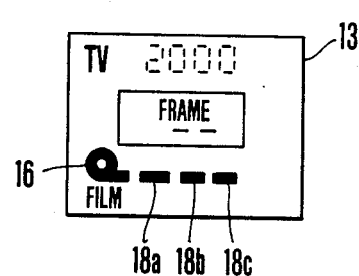
Figure 3C:
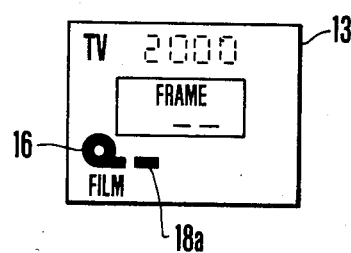
Figure 3F:
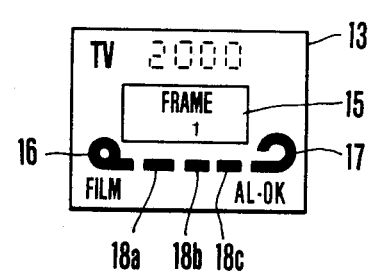

Therefore, the counting operation of the counter 32 results only in driving the two patterns 18a and 18b out of the three, and changing the indicating state as shown from FIG. 3B to FIG. 3D. And, the change does not proceed to FIG. 3E.

However, when the counter 32 has counted two pulses, its output Q2 becomes high level. Responsive to this, the flip-flop 50 is set, permitting the gate G21 to produce an output of high level when the switch SW4 turns off as the shutter charging (film winding) operation terminates. This output of high level from the gate G21 is applied through the gates G3 to G5 and G9 to G11 to the driver 29. Accordingly, even in this case, when the shutter charging is completed, the third rectangular pattern 18c is driven. As a result, the changing of the indicating pattern proceeds to the position of FIG. 3F. Thus, the operator is informed that the film feeding operation is normal.

As has been described above, in the present invention, when the number of pulses produced has reached a value more than one-half of the number of pulses which should be produced when the film feeding operation is normal, the film feeding operation carried out for now is regarded as normal so that the indicating pattern of the indicator is made to proceed to the final position representing that the film has advanced through the full length of one frame. Therefore, even if it happens by some cause that despite the normal film feeding operation having taken place, the number of pulses produced is somewhat fewer than when it is normal, the indicating state shows itself in a similar fashion to that when the operation is normal, thereby it being made possible to prevent the photographer from mistaking the film feeding operation as a faulty operation despite it has taken place normally.

Figure 5:
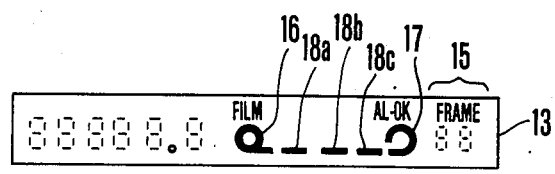
FIG. 5 is a plan view of the indication device of the invention as arranged within the viewfinder of the camera.
Figure 5:
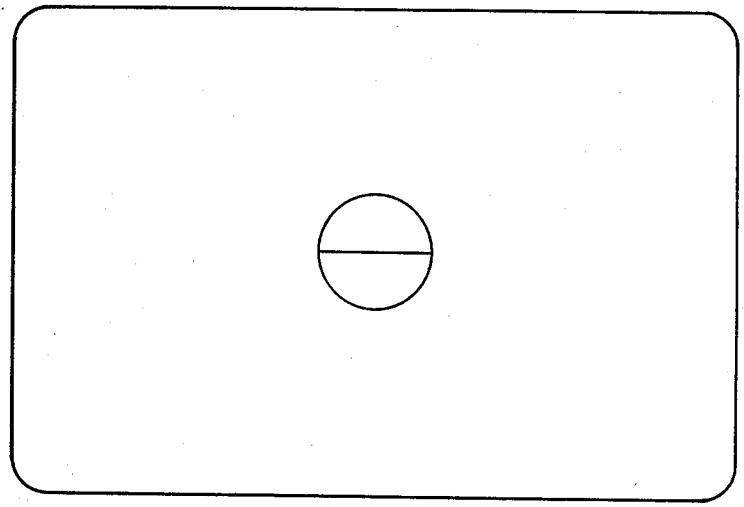

Though the above-described indication can be viewed from the outside of the camera housing, an additional indicator may be used within the finder as shown in FIG. 5, while its driver is in common with the driver 29. Also, as the indicator use may be made of a buzzer or other suitable sound type indicator.

What is claimed is:

1. A film feeding indication device for a camera, comprising:
    (a) monitor signal forming means for forming a monitor signal corresponding to the film feeding;
    (b) detection means for generating an output when the signal of said monitor signal forming means reaches a predetermined value indicating a normal film feeding;
    (c) indication means for instructing completion of the film feeding in response to the output of said detection means; and
    (d) control means for causing said indication means to instruct completion of the film feeding irrespective of the output of the detection means when the film feeding by said film feeding means has been completed before the signal of said monitor signal forming means reaches the predetermined value.

2. A device according to claim 1, wherein said monitor signal forming means emits a signal of a value corresponding to a number of pulses from pulse forming means which forms pulses in response to the film feeding, said detection means generating the output therefrom when the number of pulses reaches a predetermined value and the control means causes the indication means to instruct completion of the film feeding irrespective of the output of said detection means when the film feeding by said film feeding means has been completed while the number of the pulses is still half or more of the predetermined value.

3. A film feeding indication device for a camera, comprising:
    (a) switch means which repeats on and off operations in response to the film feeding;
    (b) detection means for generating an output by detecting the on and off operations of said switch means when the on and off operations are effected a predetermined number of times indicating completion of normal film feeding;
    (c) indication means for instructing completion of the film feeding in response to the output of said detection means; and
    (d) control means for causing said indication means to instruct completion of the film feeding irrespective of the output of said detection means when the film feeding by said film feeding means is completed while the on and off operations are repeated a half or more of the predetermined number.

4. A device according to claim 1, wherein said indication means displays different patterns corresponding to the signal value of said monitor signal forming means, and displays a pattern indicating completion of the film feeding when the signal value reaches a predetermined value.

5. A device according to claim 2, wherein said indication means displays different patterns corresponding to the number of pulses from said pulse forming means and displays a pattern indicating completion of the film feeding when the pulse number reaches said predetermined value.

6. A device according to claim 3, wherein said indication means displays different patterns corresponding to the number of the on and off operations of said switch means and displays a pattern indicating completion of the film feeding when the number of the on and off operations reaches the predetermined number.

* * * * *